US009322723B2

(12) United States Patent
Stachow et al.

(10) Patent No.: US 9,322,723 B2
(45) Date of Patent: Apr. 26, 2016

(54) ENERGY HARVESTING SURVEY APPARATUS AND METHOD OF DETECTING THERMAL ENERGY

(75) Inventors: Robert Paul Stachow, Carson City, NV (US); Brandon James Rank, Minden, NV (US); Trevor Shaun Kavanaugh, Minden, NV (US)

(73) Assignee: General Electric Company, Schenectady, NY (US)

( * ) Notice: Subject to any disclaimer, the term of this patent is extended or adjusted under 35 U.S.C. 154(b) by 717 days.

(21) Appl. No.: 13/545,873

(22) Filed: Jul. 10, 2012

(65) Prior Publication Data

US 2014/0016665 A1 Jan. 16, 2014

(51) Int. Cl.
*G01N 25/00* (2006.01)
*G01K 17/20* (2006.01)
*G01K 17/08* (2006.01)

(52) U.S. Cl.
CPC .............. *G01K 17/20* (2013.01); *G01K 17/08* (2013.01)

(58) Field of Classification Search
None
See application file for complete search history.

(56) References Cited

U.S. PATENT DOCUMENTS

| | | | |
|---|---|---|---|
| 4,326,780 A | | 4/1982 | Kim |
| 4,448,545 A * | | 5/1984 | Pelka et al. ........... 374/41 |
| 6,026,784 A * | | 2/2000 | Weisman et al. ........ 123/436 |
| 6,220,750 B1 * | | 4/2001 | Palti ...................... 374/164 |
| 6,393,840 B1 * | | 5/2002 | Hay ....................... 60/618 |
| 6,585,408 B2 * | | 7/2003 | El-Gabry et al. ........ 374/43 |
| 6,960,017 B1 * | | 11/2005 | Menicucci ............ G01K 17/06 374/39 |
| 7,116,036 B2 | | 10/2006 | Balasubramaniam et al. |
| 7,446,459 B2 | | 11/2008 | Xu et al. |
| 7,659,636 B2 | | 2/2010 | Donelan et al. |
| 2006/0209920 A1 * | | 9/2006 | Kamiyama et al. ....... 374/29 |
| 2008/0278028 A1 | | 11/2008 | Donelan et al. |
| 2008/0300660 A1 | | 12/2008 | John |

(Continued)

FOREIGN PATENT DOCUMENTS

WO 0003634 A1 1/2000
WO 2010042565 A1 4/2010

(Continued)

OTHER PUBLICATIONS

Aktakka et al., A Self-Supplied Inertial Piezoelectric Energy Harvester With Power-Management IC, Solid-State Circuits Conference Digest of Technical Papers (ISSCC), 2011 IEEE International, Feb. 20-24, 2011.

(Continued)

*Primary Examiner* — Lisa Caputo
*Assistant Examiner* — Nasir U Ahmed
(74) *Attorney, Agent, or Firm* — Fletcher Yoder, PC

(57) ABSTRACT

An energy harvesting survey apparatus includes a main body having a first end positioned proximate to a machine configured to produce thermal energy and a second end positioned a predefined distance from the first end. At least one first sensor is coupled to the first end and is configured to detect a temperature of a surface of the machine. At least one second sensor is coupled to the second end and is configured to detect a temperature of ambient air substantially surrounding the machine. A circuit is coupled to the first and second sensors, and is configured to generate at least one output representative of an expected power output of a thermoelectric generator coupled to the machine based at least in part on the detected machine surface temperature and the detected ambient air temperature. A display device is coupled to the circuit and is configured to display the output.

15 Claims, 2 Drawing Sheets

(56) References Cited

U.S. PATENT DOCUMENTS

| | | |
|---|---|---|
| 2010/0084920 A1 | 4/2010 | Banting et al. |
| 2010/0090656 A1 | 4/2010 | Shearer et al. |
| 2010/0107755 A1* | 5/2010 | Van Der Weil ............ 73/204.11 |
| 2010/0122804 A1 | 5/2010 | Yang |
| 2010/0143619 A1 | 6/2010 | Yang |
| 2011/0018686 A1 | 1/2011 | Fahley et al. |
| 2011/0088881 A1 | 4/2011 | Yang |
| 2011/0094718 A1 | 4/2011 | Yang |
| 2011/0115222 A1 | 5/2011 | Parker et al. |
| 2011/0208010 A1 | 8/2011 | McKenna |
| 2011/0270043 A1 | 11/2011 | McKenna |

FOREIGN PATENT DOCUMENTS

| | | |
|---|---|---|
| WO | 2010103332 A1 | 9/2010 |
| WO | 2011003985 A1 | 1/2011 |
| WO | 2011011110 A1 | 1/2011 |
| WO | 2011038307 A1 | 3/2011 |
| WO | 2011041679 A2 | 4/2011 |
| WO | 2011042611 A1 | 4/2011 |
| WO | 2011050473 A1 | 5/2011 |
| WO | 2011053925 A1 | 5/2011 |
| WO | 2011056242 A1 | 5/2011 |
| WO | 2011057040 A2 | 5/2011 |

OTHER PUBLICATIONS

Sankaran et al., Investigation of the Heat Distribution Around Cable Ducts in a Desert Climate, Power Engineering Society General Meeting, 2004, IEEE, Jun. 20, 20004.

* cited by examiner

ENERGY HARVESTING SURVEY APPARATUS AND METHOD OF DETECTING THERMAL ENERGY

BACKGROUND OF THE INVENTION

The field of the invention relates generally to energy harvesting survey systems and, more particularly, to an energy harvesting survey apparatus for use with energy harvesting survey systems.

At least some known machines, such as auxiliary assets that are used in power generation or refining applications, such as electric motors and motor-driven pumps may generate excess or waste heat. For example, machines, such as steam turbines or gas turbines may generate excess or waste heat that does not have an immediate use in, for example, the power generation process. As a result, the machines may be part of, or combined with, energy harvesting systems that attempt to capture the waste heat such that thermal energy from the waste heat may be available for use, such as, for example, power generation. At least some known energy harvesting systems may include, for example, thermoelectric generators that are configured to capture thermal energy. At least some known thermoelectric generators include a junction of two dissimilar materials, such as two dissimilar electrical conductors. A thermal gradient formed between the two conductors produces a voltage. Large power outputs are generated by electrically connecting many junctions together in series and by connecting many junctions thermally in parallel.

Energy harvesting systems, however, are dependant on available waste heat, but many plants and/or factories are unable to detect how much thermal energy is available by waste heat from a machine. During a site evaluation, for example, it may be cumbersome to accurately detect and/or measure the housing temperature of the machine and surrounding air. There is a substantial burden of equipment and setup time associated with positioning temperature sensors and related equipment within the plants and/or factories. Even if the temperature can be readily detected and/or measured, the determination of whether a machine is a substantially viable energy harvester source may be tedious and time-consuming. For example, data regarding the detected temperatures may need to be entered into a computing device such that an expected amount of thermal energy to be produced by an energy harvesting system, based on the detected temperatures, may be determined and/or displayed to a user.

BRIEF DESCRIPTION OF THE INVENTION

In one embodiment, an energy harvesting survey apparatus is provided. The energy measuring apparatus includes a main body having a first end positioned proximate to a machine that is configured to produce thermal energy and a second end positioned a predefined distance from the first end. At least one first sensor is coupled to the first end and is configured to detect a temperature of a surface of the machine. At least one second sensor is coupled to the second end and is configured to detect a temperature of ambient air substantially surrounding the machine. A circuit is coupled to the first and second sensors, and the circuit is configured to generate at least one output representative of an expected power output of a thermoelectric generator coupled to the machine based at least in part on the detected machine surface temperature and the detected ambient air temperature. A display device is coupled to the circuit and the display device is configured to display the expected power output and/or measured temperatures.

In another embodiment, an energy harvesting survey system is provided. The energy harvesting survey system includes a machine configured to generate thermal energy and an energy harvesting survey apparatus coupled to the machine. The energy harvesting survey apparatus includes a main body having a first end positioned proximate to the machine and a second end positioned a predefined distance from the first end. At least one first sensor is coupled to the first end and is configured to detect a temperature of a surface of the machine. At least one second sensor is coupled to the second end and is configured to detect a temperature of ambient air substantially surrounding the machine. A circuit is coupled to the first and second sensors, and the circuit is configured to generate at least one output representative of an expected power output of a thermoelectric generator coupled to the machine based at least in part on the detected machine surface temperature and the detected ambient air temperature. A display device is coupled to the circuit and the display device is configured to display the expect power output and/or measured temperatures.

In yet another embodiment, a method for measuring thermal energy is provided. A temperature of a surface of a machine is detected via at least one first sensor, wherein the machine is configured to produce thermal energy. A temperature of ambient air substantially surrounding the machine is detected via at least one second sensor. At least one signal representative of the detected machine surface temperature and at least one signal representative of the detected ambient air temperature are transmitted to a circuit. At least one output representative of an expected power output of a thermoelectric generator coupled to the machine based at least in part on the detected machine surface temperature and the detected ambient air temperature is generated by the circuit. The output is displayed via a display device.

DETAILED DESCRIPTION OF THE INVENTION

The exemplary apparatus, systems, and methods described herein overcome at least some disadvantages associated with known energy harvesting survey systems by providing an apparatus that efficiently and substantially instantaneously determines if a machine is a viable energy harvester source. In particular, the embodiments described herein provide an energy harvesting survey apparatus that is removably coupled to a machine and the apparatus includes sensors that detect pertinent temperature values for the machine. The energy harvesting survey apparatus also includes a circuit that generates at least one output representative of an expected power output of a thermoelectric generator coupled to the machine based at least in part on the detected temperature values. A display device is coupled to the circuit such that the output may be displayed to a user to enable the user to identify the machine as a substantially viable energy harvester source. Accordingly, the pertinent temperatures can be obtained and a determination of whether a machine is a viable energy harvester source can be done with one apparatus. As such, equipment and setup time associated with positioning temperature sensors and related equipment within, for example, plants or factories, is substantially reduced. Further, the determination of whether a machine is a substantially viable energy harvester source may no longer be tedious and time-consuming.

Figure 1:
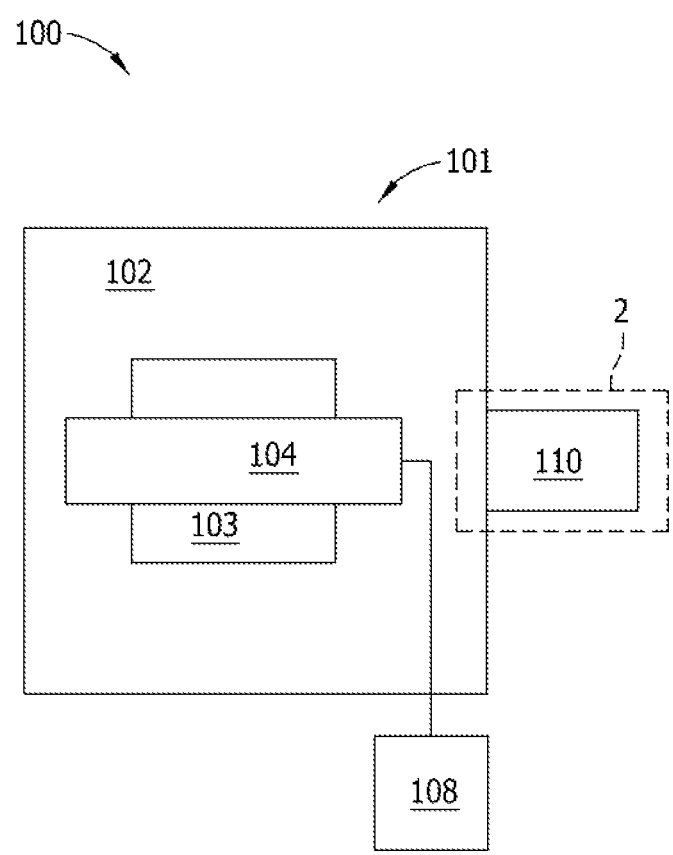
FIG. 1 is a block diagram of an exemplary energy harvesting survey system.

FIG. 1 illustrates an energy harvesting survey system 100 that includes a power generation system 101. While the exemplary embodiment includes a power generation system 101, it should be noted that the current disclosure is not limited to power generation systems. Energy harvesting survey system 100 may include any type of system that produces energy, such as waste heat, and one of ordinary skill in the art will appreciate that the current disclosure may be used with any type of system.

In the exemplary embodiment, power generation system 101 includes a machine 102, which is a gas turbine. Machine 102 may also be any other type of machine that generates excess or waste heat, such as a hydroelectric steam turbine. While the exemplary power generation system 101 includes one machine 102 that is a gas turbine, it should be noted that power generation system 101 may include any number of machines and/or combinations of different types of machines. For example, power generation system 101 may be a combined-cycle power generation system that includes at least one gas turbine and at least one steam turbine. Moreover, machine 102 may include any object capable of enabling harvesting of waste heat, including, for example, pumps, motors, piping and structures.

Machine 102 includes at least one component, such as a rotor 103 and a drive shaft 104. Moreover, in the exemplary embodiment, drive shaft 104 is operatively coupled to a load 108, such as a generator, and rotor 103 is configured to rotate drive shaft 104. It should be noted that, as used herein, the term "couple" is not limited to a direct communicative, mechanical, and/or an electrical connection between components, but may also include an indirect communicative, mechanical, and/or electrical connection between multiple components. In the exemplary embodiment, drive shaft 104 is at least partially supported by one or more bearings (not shown) housed within machine 102 and/or within load 108. Alternatively or additionally, the bearings may be housed within a separate support structure (not shown), such as a gearbox, or any other structure that enables machine 102 and/or energy harvesting survey system 100 to function as described herein.

Energy harvesting survey system 100, in the exemplary embodiment, also includes an energy harvesting survey apparatus 110 coupled to power generation system 101. More specifically, in the exemplary embodiment, energy harvesting survey apparatus 110 is removably attached to machine 102 such that energy harvesting survey apparatus 110 is positioned on a surface (not shown in FIG. 1) of machine 102. As explained in more detail below, energy harvesting survey apparatus 110 is configured to detect a temperature of the surface of machine 102 and to detect a temperature of ambient air substantially surrounding machine 102. Energy harvesting survey apparatus 110 is also configured to generate at least one output representative of an expected amount of thermal energy to be produced by machine 102 based at least in part on the detected machine surface temperature and the detected ambient air temperature. Moreover, in the exemplary embodiment, energy harvesting survey apparatus 110 is configured to display the output to a user.

During operation, machine 102 generates mechanical rotational energy via rotor 103 and drives generator 108. Generator 108 then supplies electrical power to, for example, a power distribution system (not shown). Moreover, in the exemplary embodiment, as rotational energy is generated via rotor 103, machine 102 also generates waste heat, which does not have an immediate use in the power generation process. Further, in the exemplary embodiment, energy harvesting survey apparatus 110 enables a user to determine whether the waste heat generated by machine 102 is sufficient to deem machine 102 as a substantially viable energy harvester source.

As explained in more detail below, energy harvesting survey apparatus 110 detects a temperature of the surface of machine 102 and detects a temperature of ambient air substantially surrounding machine 102. In the exemplary embodiment, energy harvesting survey apparatus 110 then generates at least one output representative of an expected power output to be produced by thermoelectric generator 108 that is coupled to machine 102 based at least in part on the detected machine surface temperature and the detected ambient air temperature. Alternatively, energy harvesting survey apparatus 110 may generate at least one output representative of an expected power output that may be produced by machine 102. Energy harvesting survey apparatus 110 then displays the output to the user such that the user can determine whether machine 102 is a substantially viable energy harvester source. Accordingly, energy harvesting survey apparatus 110 enables pertinent temperature values to be obtained, while also enabling a determination of whether machine 102 is a viable energy harvester source. As such, energy harvesting survey apparatus 110 facilitates an efficient and substantially instantaneous determination as to whether machine 102 is a viable energy source.

Figure 2:
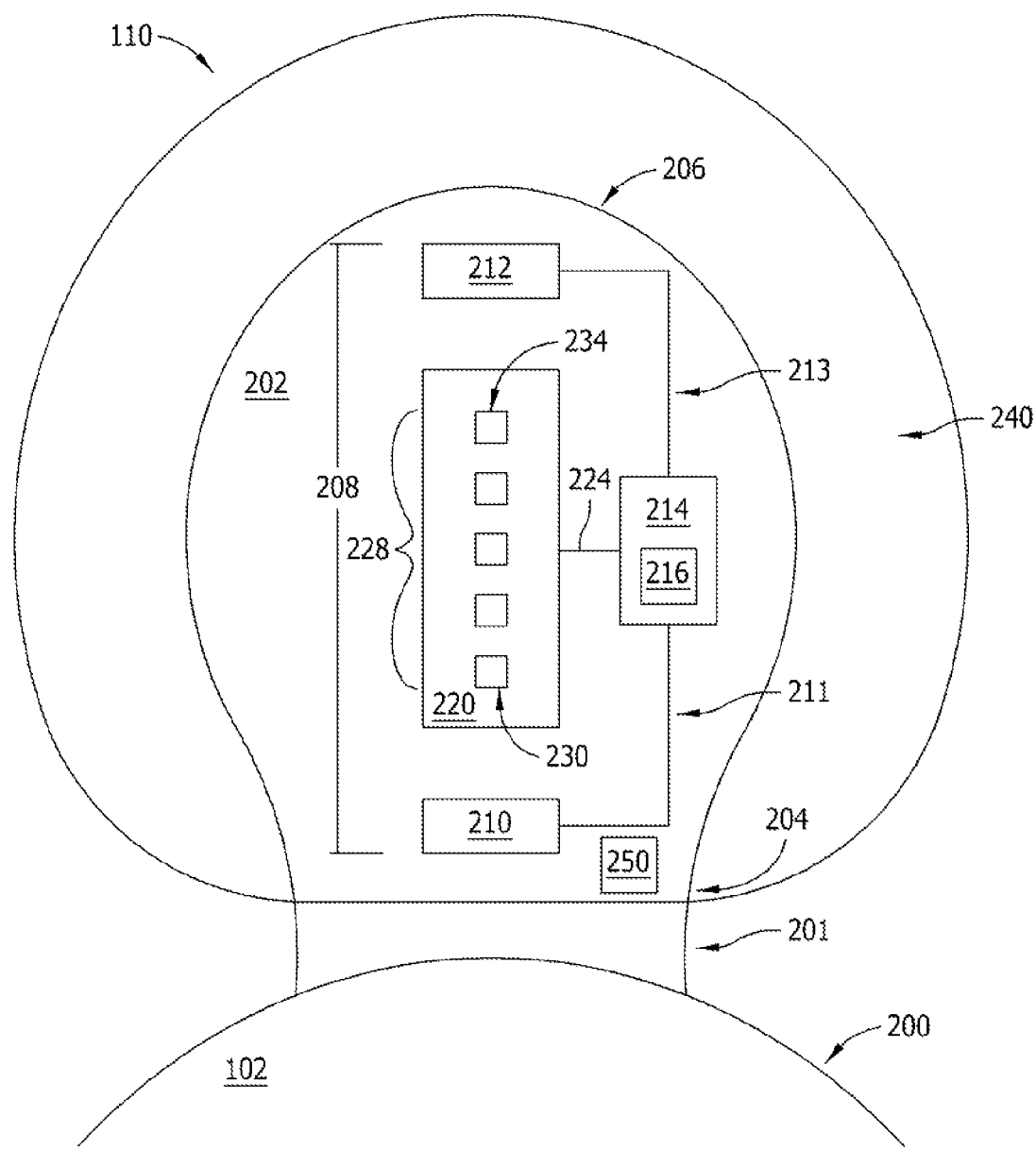
FIG. 2 is a block diagram of an exemplary energy harvesting survey apparatus that may be used with the energy harvesting survey system shown in FIG. 1 and taken along area 2.

FIG. 2 illustrates energy harvesting survey apparatus 110 positioned on a surface 200 of machine 102 and taken along area 2 (shown in FIG. 1). More specifically, in the exemplary embodiment, energy harvesting survey apparatus 110 includes a magnet 201 such that energy harvesting survey apparatus 110 may be removably coupled to machine surface 200. Alternatively, energy harvesting survey apparatus 110 may use any other suitable means to couple to machine surface 200.

In the exemplary embodiment, energy harvesting survey apparatus 110 includes a main body 202 that includes a first end portion 204 positioned proximate to machine surface 200 and coupled to magnet 201. Main body 202 also includes a second end portion 206 positioned a predefined distance 208 from first end portion 204. At least one first sensor 210 is coupled to first end portion 204. In the exemplary embodiment, first sensor 210 is a temperature sensor that is configured to detect a temperature of machine surface 200. Moreover, at least one second sensor 212 is coupled to second end portion 206. More specifically, in the exemplary embodiment, second sensor 212 is a temperature sensor that is configured to detect a temperature of ambient air substantially surrounding machine 102. In the exemplary embodiment, first sensor 210 and second sensor 212 each detect temperature values in degrees Celsius, ° C. Alternatively, first sensor 210 and second sensor 212 may detect temperature values in any other suitable units that enables energy harvesting survey apparatus 110 and/or energy harvesting survey system 100 to function as described herein.

Energy harvesting survey apparatus 110, in the exemplary embodiment, also includes a circuit 214 that is coupled to first sensor 210 and second sensor 212. More specifically, in the exemplary embodiment, first sensor 210 is coupled to circuit 214 via a conduit 211 and second sensor 212 is coupled to circuit via a conduit 213. In the exemplary embodiment, circuit 214 includes any suitable analog and/or digital circuit and/or circuit components. For example, circuit 214 may include any suitable processor-based or microprocessor-based system, such as a computer system, that includes microcontrollers, reduced instruction set circuits (RISC), application-specific integrated circuits (ASIC), programmable logic controllers (PLC), logic circuits, and/or any other circuit or processor that is capable of executing the functions described herein. In one embodiment, circuit 214 may include a processor 216 having a single processing unit or having multiple processing units (e.g., in a multi-core configuration). The above examples are exemplary only, and thus are not intended to limit in any way the definition and/or meaning of the term "circuit."

In the exemplary embodiment, circuit 214 is configured to generate an output of a temperature value, $\Delta T$, which is generated by calculating a difference between the detected machine surface temperature, $T_{machine}$, and the detected ambient air temperature, $T_{ambient}$. Circuit 214 may also generate an output of a comparison of the temperature value, $\Delta T$, with a different value. For example, circuit 214 may generate such an output by comparing the temperature value, $\Delta T$, with a predefined threshold temperature value.

Circuit 214 may also use the calculated temperature value, $\Delta T$, to generate at least one output representative of an expected power output of thermoelectric generator 108 coupled to machine 102, wherein the expected power output has units of energy per unit time (e.g., Watt). More specifically, the expected power output is representative of an expected heat flux through a known thermoelectric generator. In the exemplary embodiment, circuit 214 may be configured to calculate the expected power output by any suitable methods known in the art. For example, processor 216 may be programmed with various algorithms known in the art to determine the expected power output. In the exemplary embodiment, for example, processor 216 may be programmed to perform the calculation using Equation 1, as shown below.

$$E_{dot} = f(T_{machine}, T_{ambient}) \qquad \text{(Eq. 1)}$$

More specifically, in Equation 1, function, $f$, takes temperatures as input arguments and is defined by generator 108 parameters, such as, for example, conversion efficiency, heat sink size, and cross-sectional area. Moreover, in Equation 1, $E_{dot}$ is substantially equal to the expected power output of thermoelectric generator 108. Circuit 214 may also be configured to generate an output of a comparison of the expected power output with a different value. For example, circuit 214 may generate such an output by comparing the calculated expected power output with a predefined threshold value.

Moreover, in the exemplary embodiment, energy harvesting survey apparatus 110 includes a display device 220 that is coupled to circuit 214 via a conduit 224, wherein display device 220 is configured to display the output(s) generated by circuit 214 to a user. More specifically, in the exemplary embodiment, display device 220 is a visual display device, such as a cathode ray tube (CRT), a liquid crystal display (LCD), an light emitting diode (LED) display, an organic LED display, and/or an "electronic ink" display. For example, display device 220 may include at least one LED 228, wherein LED 228 is activated when, for example, the output generated by circuit 214 represents that the calculated expected power output exceeds a predefined threshold value. Accordingly, LED 228 may emit a light to a user when the predefined threshold value for a power output has been reached and/or exceeded. Similarly, LED 228 may be activated when the calculated temperature value, $\Delta T$, exceeds a predefined threshold temperature value. Display device 220 may also include a plurality of LEDs 228 to indicate a gradient of different levels of calculated amounts of power outputs or temperature values, $\Delta T$. For example, a first LED 230 may represent the lowest amount of power output that can be produced or the lowest calculated temperature value, $\Delta T$. A fifth or last LED 234 may represent the highest amount of power output that can be produced or the highest calculated temperature value, $\Delta T$. Display device 220 may also display the output generated by circuit 214 in any other manner that enables energy harvesting survey apparatus 110 and/or energy harvesting survey system 100 to function as described herein. For example, display device 220 may present the actual calculated temperature value, $\Delta T$, for machine 102 and/or the calculated expected power output.

In the exemplary embodiment, energy harvesting survey apparatus 110 may also include a casing 240 that substantially encloses at least a portion of apparatus 110. More specifically, in the exemplary embodiment, casing 240 may substantially enclose at least a portion of main body 202. Casing 240 may be composed of any suitable material, such as a metal, and include a cavity (not shown) to enclose apparatus therein and protect energy harvesting survey apparatus 110 from, for example, dirt or debris, within system 100. Moreover, in the exemplary embodiment, energy apparatus 110 may include a power supply 250 that is coupled within main body 202 and is configured to provide electrical energy to energy harvesting survey apparatus 110. In the exemplary embodiment, power supply 250 is a battery, such as a rechargeable lithium ion battery. Alternatively, power supply 250 may be any type of device configured to supply electrical energy within energy harvesting survey apparatus 110.

During operation, machine 102 generates waste heat. In the exemplary embodiment, energy harvesting survey apparatus 110 enables a user to determine whether the waste heat generated by machine 102 is sufficient to deem machine 102 as a substantially viable energy harvester source.

More specifically, first sensor 210 detects a temperature of machine surface 200 and second sensor 212 detects a temperature of ambient air substantially surrounding machine 102. First sensor 210 transmits a signal representative of the detected machine surface temperature via conduit 211 to circuit 214, and second sensor 212 transmits a signal representative of the ambient air temperature via conduit 213 to circuit 214. Circuit 214 then generates at least one output representative of an expected amount of thermal energy to be produced by machine 102 based at least in part on the detected machine surface temperature received and the detected ambient air temperature received.

In one embodiment, circuit 214 may generate an output of a temperature value, $\Delta T$, which is generated by calculating a difference between the detected machine surface temperature and the detected ambient air temperature. Circuit 214 may also generate an output for a comparison of the temperature value, $\Delta T$, with a different value. For example, circuit 214 may compare the temperature value, $\Delta T$, with a predefined threshold temperature value. Alternatively, circuit 214 may use the calculated temperature value, $\Delta T$, to generate an output of an expected power output of thermoelectric generator 108 coupled to machine 102. Circuit 214 may also generate an output for a comparison of the calculated expected power output with a different value. For example, circuit 214 may compare the calculated expected power output with a predefined threshold value.

The output(s) generated by circuit are then transmitted to display device 220 such that the output(s) may be presented to a user. For example, LED 228 may be activated and emit a light to the user when the predefined threshold value for power output has been reached and/or exceeded. Similarly, LED 228 may be activated when the calculated temperature value, $\Delta T$, exceeds a predefined threshold temperature value.

Display device 220 may also display an indication of a gradient of different levels of power outputs or temperature values, ΔT. For example, first LED 230 may be activated when the output generated by circuit 214 represents the lowest power output that can be produced or the lowest temperature value, ΔT, for machine 102. When the output(s) are displayed to the user, the user can then determine if machine 102 is a substantially viable energy harvester source.

As compared to known apparatus, systems, and methods that are used to quantify energy, such as thermal energy, the embodiments described herein provide an energy harvesting survey apparatus that enables an efficient and substantially instantaneous determination of whether a machine is a viable energy harvester source. In particular, the embodiments described herein provide an energy harvesting survey apparatus that is removably coupled to a machine. The energy measuring apparatus includes a main body having a first end positioned proximate to a machine that is configured to produce thermal energy and a second end positioned a predefined distance from the first end. At least one first sensor is coupled to the first end and is configured to detect a temperature of a surface of the machine. At least one second sensor is coupled to the second end and is configured to detect a temperature of ambient air substantially surrounding the machine. A circuit is coupled to the first and second sensors, and the circuit is configured to generate at least one output representative of an expected power output of a thermoelectric generator coupled to the machine based at least in part on the detected machine surface temperature and the detected ambient air temperature. A display device is coupled to the circuit and the display device is configured to display the output to enable the user to identify the machine as a viable energy harvester source. Accordingly, the pertinent temperatures can be obtained and a determination of whether a machine is a viable energy harvester source can be done with one apparatus. As such, equipment and setup time associated with positioning temperature sensors and related equipment within, for example, plants or factories, is substantially reduced. Further, the determination of whether a machine is a substantially viable energy harvester source may no longer be tedious and time-consuming.

A technical effect of the apparatus, systems, and methods described herein includes at least one of: (a) detecting a temperature of a surface of a machine via at least one first sensor, wherein the machine is configured to produce thermal energy; (b) detecting a temperature of ambient air substantially surrounding a machine via at least one second sensor; (c) transmitting at least one signal representative of a detected machine surface temperature and at least one signal representative of a detected ambient air temperature to a circuit; (d) generating, via a circuit, at least one output representative of an expected power output of a thermoelectric generator coupled to a machine based at least in part on a detected machine surface temperature and a detected ambient air temperature; and (e) displaying at least one output via a display device.

Exemplary embodiments of the apparatus, systems, and methods are described above in detail. The apparatus, systems, and methods are not limited to the specific embodiments described herein, but rather, components of the apparatus, systems, and/or steps of the methods may be utilized independently and separately from other components and/or steps described herein. For example, the system may also be used in combination with other apparatus, systems, and methods, and is not limited to practice with only the system as described herein. Rather, the exemplary embodiment can be implemented and utilized in connection with many other applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An energy harvesting survey apparatus comprising:
   a casing comprising a proximal end coupled to a machine that is configured to produce thermal energy and a distal end positioned a predefined distance from the proximal end;
   at least one first sensor coupled to the proximal end of the casing, wherein the at least one first sensor is configured to detect a temperature of a surface of the machine;
   at least one second sensor coupled to the distal end of the casing, wherein the at least one second sensor is configured to detect a temperature of ambient air substantially surrounding the machine;
   a circuit coupled to the at least one first sensor and the at least one second sensor, wherein the circuit is configured to generate at least one output representative of an expected power output of a thermoelectric generator coupled to the machine as a function of the detected machine surface temperature and the detected ambient air temperature; and
   a display device coupled to the circuit, wherein the display device is configured to display the at least one output, and wherein the display device and the circuit are disposed within the casing and between the at least one first sensor and the at least one second sensor.

2. The energy harvesting survey apparatus of claim 1, comprising a magnet coupled to the main body, wherein the magnet is configured to enable the energy harvesting survey apparatus to be removably coupled to the machine.

3. The energy harvesting survey apparatus in accordance with claim 1, comprising a casing to enclose at least a portion of the main body, wherein the portion comprises the circuit.

4. The energy harvesting survey apparatus in accordance with claim 1, comprising a power supply coupled within the main body, wherein the power supply is configured to provide electrical energy to the energy harvesting survey apparatus.

5. The energy harvesting survey apparatus in accordance with claim 1, wherein the display device comprises a plurality of light-emitting diodes configured to activate when a calculated temperature value exceeds a first predefined threshold value.

6. The energy harvesting survey apparatus in accordance with claim 5, wherein a second light-emitting diode activates when the calculated temperature value exceeds a second predefined threshold value.

7. The energy harvesting survey apparatus in accordance with claim 1, wherein the circuit is configured to generate the at least one output by calculating a temperature value representative of the difference between the detected machine surface temperature and the detected ambient air temperature, wherein the temperature value represents an amount of available power output for the machine.

8. An energy harvesting survey system comprising:
a machine configured to generate thermal energy; and
an energy harvesting survey apparatus coupled to the machine, the energy harvesting survey apparatus comprising:
a casing comprising a proximal end positioned proximate to the machine and a distal end positioned a predefined distance from the proximal end;
at least one first sensor coupled to the proximal end of the casing, wherein the at least one first sensor is configured to detect a temperature of a surface of the machine;
at least one second sensor coupled to the distal end of the casing, wherein the at least one second sensor is configured to detect a temperature of ambient air substantially surrounding the machine;
a circuit coupled to the at least one first sensor and the at least one second sensor, wherein the circuit is configured to generate at least one output representative of an expected power output of a thermoelectric generator coupled to the machine as a function of the detected machine surface temperature and the detected ambient air temperature; and
a display device coupled to the circuit, wherein the display device is configured to display the at least one output, and wherein the display device and the circuit are disposed within the casing and between the at least one first sensor and the at least one second sensor.

9. The energy harvesting survey system in accordance with claim 8, wherein the energy harvesting survey apparatus further comprises a magnet coupled to the main body, wherein the magnet is configured to enable the energy harvesting survey apparatus to be removably coupled to the machine.

10. The energy harvesting survey system in accordance with claim 8, wherein the energy harvesting survey apparatus further comprises a casing to enclose at least a portion of the main body, wherein the portion comprises the circuit.

11. The energy harvesting survey system in accordance with claim 8, wherein the energy harvesting survey apparatus further comprises a power supply coupled within the main body, wherein the power supply is configured to provide electrical energy to the energy harvesting survey apparatus.

12. The energy harvesting survey system in accordance with claim 8, wherein the display device comprises a plurality of light-emitting diodes.

13. The energy harvesting survey system in accordance with claim 8, wherein the circuit is configured to generate the at least one output by calculating a temperature value representative of a difference between the detected machine surface temperature and the detected ambient air temperature, wherein the temperature value represents an amount of available power output for the machine.

14. The energy harvesting survey system in accordance with claim 13, wherein the circuit is configured to generate the at least one output by comparing the temperature value with a predefined threshold value.

15. The energy harvesting survey system in accordance with claim 8, wherein the machine comprises one of a gas turbine and a steam turbine.

* * * * *